(12) United States Patent
Karl et al.

(10) Patent No.: US 10,061,297 B2
(45) Date of Patent: Aug. 28, 2018

(54) METHOD OF SETTING UP A GEAR CUTTING MACHINE AND GEAR CUTTING MACHINE

(71) Applicant: Liebherr-Verzahntechnik GmbH, Kempten (DE)

(72) Inventors: Thomas Karl, Durach (DE); Marco Heider, Kempten (DE)

(73) Assignee: Liebherr-Verzahntechnik GmbH, Kempten (DE)

( * ) Notice: Subject to any disclaimer, the term of this patent is extended or adjusted under 35 U.S.C. 154(b) by 587 days.

(21) Appl. No.: 14/482,744

(22) Filed: Sep. 10, 2014

(65) Prior Publication Data
US 2015/0081075 A1   Mar. 19, 2015

(30) Foreign Application Priority Data
Sep. 13, 2013   (DE) .................. 10 2013 015 239

(51) Int. Cl.
*G05B 19/4097* (2006.01)
*B23F 23/00* (2006.01)
(Continued)

(52) U.S. Cl.
CPC ......... *G05B 19/4097* (2013.01); *B23F 23/00* (2013.01); *B23Q 15/22* (2013.01);
(Continued)

(58) Field of Classification Search
CPC .......... G05B 19/4097; G05B 19/40937; G05B 2219/35043; G05B 2219/35035;
(Continued)

(56) References Cited

U.S. PATENT DOCUMENTS 5,345,390 A * 9/1994 Greenip, Jr. ........ B23F 23/1287
700/175
7,251,542 B2 * 7/2007 Arvin ...................... B23F 19/10
700/159
(Continued)

FOREIGN PATENT DOCUMENTS

DE   102011052314 A1   2/2013

OTHER PUBLICATIONS

German Patent and Trademark Office, Search Report of German Patent Application No. 102013015239.9, dated Jan. 22, 2014, 9 pages.
(Continued)

*Primary Examiner* — Charles Kasenge
(74) *Attorney, Agent, or Firm* — McCoy Russell LLP (57) ABSTRACT

The present disclosure relates to a method of setting up a gear cutting machine, wherein the gear cutting machine is equipped with at least one machine part which can be set up and the parameters relating to the set-up machine part are input into the machine control for the subsequent gear cutting process, wherein a graphical model of the machine part is virtually composed on a display element of the gear cutting machine in a user-controlled manner from one or more graphical part components and the required parameters for the following gear cutting process are derived from the graphical modeling.

19 Claims, 4 Drawing Sheets

(51) Int. Cl.
*B23Q 15/22* (2006.01)
*G05B 19/4093* (2006.01)

(52) U.S. Cl.
CPC ............. *G05B 19/40937* (2013.01); *G05B 2219/35012* (2013.01); *G05B 2219/35035* (2013.01); *G05B 2219/35043* (2013.01); *Y02P 90/265* (2015.11)

(58) Field of Classification Search
CPC .......... G05B 2219/35012; B23Q 15/22; B23F 23/00; Y02P 90/265
See application file for complete search history.

(56) References Cited

U.S. PATENT DOCUMENTS

| | | | | |
|---|---|---|---|---|
| 7,296,956 B2* | 11/2007 | Dirnfeldner | ........... | B23Q 11/08 345/7 |
| 7,327,869 B2* | 2/2008 | Boyer | ........... | G05B 23/0216 382/141 |
| 7,353,072 B2* | 4/2008 | McCall, II | ........... | G06F 17/50 700/117 |
| 7,386,359 B2* | 6/2008 | Dohle | ........... | G05B 19/4069 700/104 |
| 7,444,201 B2* | 10/2008 | Dirnfeldner | ........... | B23Q 17/24 345/173 |
| 7,599,824 B2* | 10/2009 | Shigemi | ........... | G05B 19/186 700/98 |
| 7,603,191 B2* | 10/2009 | Gross | ........... | G06F 17/50 700/97 |
| 8,175,742 B1* | 5/2012 | Arvin | ........... | B23F 19/10 700/118 |
| 8,417,370 B2* | 4/2013 | Griggs | ........... | G05B 19/401 700/174 |
| 8,429,174 B2* | 4/2013 | Ramani | ........... | G06F 17/30259 345/419 |
| 9,229,443 B2* | 1/2016 | Kikata | ........... | G05B 19/4061 |
| 9,360,861 B2* | 6/2016 | Hahn | ........... | G05B 19/4069 |
| 9,547,301 B2* | 1/2017 | Seya | ........... | G05B 19/4063 |
| 2004/0186793 A1* | 9/2004 | Harmand | ........... | G05B 19/4097 705/27.1 |
| 2005/0002151 A1* | 1/2005 | Dirnfeldner | ........... | B23Q 11/08 361/616 |
| 2005/0065746 A1* | 3/2005 | Dohle | ........... | G05B 19/4069 702/113 |
| 2005/0085940 A1* | 4/2005 | Griggs | ........... | G05B 19/401 700/181 |
| 2005/0159938 A1* | 7/2005 | Shigemi | ........... | G05B 19/186 703/7 |
| 2005/0192684 A1* | 9/2005 | Friedrich | ........... | G05B 19/4185 700/83 |
| 2005/0281453 A1* | 12/2005 | Boyer | ........... | G05B 23/0216 382/141 |
| 2006/0247815 A1* | 11/2006 | McCall, II | ........... | G06F 17/50 700/97 |
| 2006/0253214 A1* | 11/2006 | Gross | ........... | G06F 17/50 700/97 |
| 2007/0027561 A1* | 2/2007 | Dirnfeldner | ........... | B23Q 17/24 700/83 |
| 2008/0033592 A1* | 2/2008 | Okrongli | ........... | G05B 19/4083 700/179 |
| 2008/0091394 A1* | 4/2008 | Hahn | ........... | G05B 19/4069 703/7 |
| 2009/0118852 A1* | 5/2009 | Kumar | ........... | G05B 19/186 700/98 |
| 2010/0013833 A1* | 1/2010 | Gandikota | ........... | G06F 17/50 345/420 |
| 2012/0072008 A1* | 3/2012 | Neumaier | ........... | G05B 19/182 700/164 |
| 2012/0105449 A1* | 5/2012 | Buchowski | ........... | G06T 19/20 345/420 |
| 2012/0109350 A1* | 5/2012 | Buchowski | ........... | G06F 17/50 700/98 |
| 2012/0239182 A1* | 9/2012 | Kikata | ........... | G05B 19/4061 700/186 |
| 2012/0265330 A1* | 10/2012 | Beck | ........... | G05B 19/4068 700/95 |
| 2014/0074279 A1* | 3/2014 | West | ........... | G05B 19/409 700/159 |
| 2014/0121819 A1* | 5/2014 | Amidon | ........... | G05B 19/4097 700/173 |
| 2014/0163720 A1* | 6/2014 | Nelaturi | ........... | G06T 15/40 700/186 |

OTHER PUBLICATIONS

Precitool Werkzeughandel GmbH & Co. Kg, Precitool: Prazisionswerkzeuge, Jun. 11, 2010, 16 pages. For Explanation of Relevance, see NPL 1, Search Report of German Patent Application No. DE102013015239.9.

* cited by examiner

METHOD OF SETTING UP A GEAR CUTTING MACHINE AND GEAR CUTTING MACHINE

CROSS REFERENCE TO RELATED APPLICATION

This application claims priority to German Patent Application No. 10 2013 015 239.9, entitled "Method of Setting Up a Gear Cutting Machine and Gear Cutting Machine," filed Sep. 13, 2013, which is hereby incorporated by reference in its entirety for all purposes.

TECHNICAL FIELD

The present disclosure relates to a method of setting up a gear cutting machine, wherein the gear cutting machine is equipped with at least one machine part which can be set up and the parameters relating to the machine part which can be set up are input into the machine control.

BACKGROUND AND SUMMARY

Various gear cutting processes are available for machining workpieces with gear teeth. Processes exist, for example, for soft premachining, soft fine machining and hard fine machining Examples for cutting processes are hobbing and gear shaping. Shape grinding and generating grinding are available for a cutting soft fine machining.

The successful use of each process and the realization of suitable process routines are only possible by the use of optimum machines, tools and application techniques. Different platforms are provided for this purpose which allows the use of tool-specific accessories. Depending on the application and the tool, the gear cutting machine can be equipped with the matching machine parts. Provided automation is provided, machining tools, apparatus for clamping the workpiece as well as workpiece grippers count as machine parts which can be set up. The term tool in this respect includes a tool mount, e.g. a tool mandrel, where one or more tools such as millers, worm grinding wheels or grinding wheels can be placed onto the mandrel. The named apparatus and grippers can be application-specific or workpiece-specific and optimize the access to the clamped workpiece as well as its automated machining. Furthermore, the term of machine part which can be set up covers the workpiece itself.

The NC control of the machine requires precise parameter data for the controlled gear cutting process which characterize the machine parts which can be set up, i.e. which are variable, in particular with respect to their geometrical dimensions or their positions with respect to one another. The parameters inter alia include information on the type of working mandrel used as well as the number and positioning of the tools placed on the mandrel.

The configuration of the control by inputting these parameters in dependence on the actual set-up state is necessary for setting up the gear cutting machine. A complex manual measurement of the machine parts which can be set up often has to be made in advance to be able to provide the required parameters. For example, the working mandrel is measured by hand and the respective measured data are input manually into the gear cutting machine via an operating panel. In addition to the pure measured data, it may be necessary to calculate additional data in advance and to input them subsequently. Such a procedure is, however, prone to error. Even the smallest incorrect inputs can have far-reaching consequences which extend from defective workpieces up to substantial damage to the gear cutting machine due to collisions.

The subject matter of the present disclosure therefore deals with this problem in the setting up of a gear cutting machine. In this respect, an improved process for setting up the gear cutting machine should be sought.

This object is achieved by a method of setting up a gear cutting machine wherein the gear cutting machine is equipped with at least one machine part which can be set up and the parameters relating to the set-up machine part are input into the machine control for the subsequent gear cutting process. The machine part which can be set up is to be understood as in particular any accessory for the gear cutting machine which is specific to the workpiece. This may include the workpiece to be machined itself as well as tools provided for this purpose as well as optionally an apparatus for clamping the workpiece and grippers for the automation.

The term tool does not only comprise the workpiece itself, but rather the provided working mandrel on which one or more similar or different tools as well as spacer rings, clamping nuts or other components can be arranged.

In accordance with the present disclosure, the parameter input, i.e. the input of the parameters relating to the set-up machine part, takes place via a graphical modeling of the machine part on a display element of the gear cutting machine. The machine offers the user the option to reset the actually set up machine part by a graphical modeling on the display element. For this purpose, the user can virtually compose the graphical model of the machine part on the display element from one or more graphical part components/part models. The graphical model of the machine part can consequently be virtually composed on a display element of the gear cutting machine in a user-controlled manner from one or more graphical part components. For example, the user is given a selection of available part components/part models which can each be graphically presented per se. The user can select one or more part components/part models and can compose them graphically to form a model of the machine part.

The required parameters for the machine control are subsequently derived directly from the prepared modeling and provided to the gear cutting machining of the machine control. The required control configuration takes place quasi no longer by inputting pure numbers, but visually on the basis of a graphical modeling, and may be determined without additional input from the user.

The graphical modeling and presentation on the display element offers the user the possibility for the visual monitoring of his input. The user can consequently compare the prepared graphical model on the display element with the actually set up machine part; obvious errors are noticed and can be avoided in advance. Additional calculation steps are completely dispensed with. This process reduces the probability of incorrect manual inputs and increases the efficiency of the production process significantly since the parameters can be derived via the processor in the same way and following predetermined calculations, thus improving repeatability in the gear cutting process.

The user can precisely match the graphical modeling to the actually used machine part by interaction with an operating panel or with the display element.

The machine part may be the tool mandrel, including one or more tools, spacer sleeves, etc., and/or the workpiece itself and/or an apparatus for clamping the workpiece. The configuration of any machine accessory which can be set up can generally take place on the basis of the method in accordance with the present disclosure. The machine part is consequently in multiple parts and can be variably composed of individual part components. This is applied accordingly to the graphical modeling at the display element of the gear cutting machine.

Ideally, the graphical representation of the at least one machine part or of the graphical part components is calculated by a rendering process of the machine control. The raw data or scene information required for this purpose are stored in a database of the gear cutting machine.

In an embodiment of the method, the rendering process takes place in real time and the underlying scene can be interactively varied by the operator. The operator can, for example, vary the angle of view and the zoom of the representation interactively by a user input; the calculation of the computer-based model takes place in real time and is immediately visualized on the display element.

The display element is expediently touch-operable, in particular multitouch-operable, so that the operator can vary the scene of the graphically modeled machine part or of the one or more part models/part components by touching the display element. A multitouch-operable display element is in particular used so that the scene can be varied interactively by various multifinger gestures.

The user can make use of a database of the gear cutting machine for the graphical modeling of at least one machine part. The machine part can also be composed of a series of various part components such as applies to a working mandrel. The user is offered a selection option of graphical part models to virtually compose the set-up working mandrel. The database offers the user various types of mandrel for this purpose which can be equipped virtually with suitable tools as well as spacer sleeves, etc. The user can ideally graphically model any actual working mandrel to scale using the database. The control-relevant parameters for the machine control are automatically derived from the graphical modeling and supplied to the machine control. A manual configuration of the gear cutting machine with respect to the machine part used is no longer necessary.

In addition to the purely visual plausibility control of the user, a virtual plausibility control of the graphical modeling takes place in the background by the machine control. It is in particular checked and monitored here whether the inputs, i.e. the graphical modeling, of the user are sensible. For example, the virtual plausibility control takes place while taking account of a planned machining program for gear cutting and/or while taking account of the composed components of a machine part and/or while taking account of further machine parts which can be set up. A monitoring is conceivable such as whether a working mandrel is composed of a sensible selection of part components. It is also monitored whether all the tools required for the planned machining as well as the apparatus for clamping the workpiece and, if present, the grippers for the automation, were set up and/or configured.

The machine control can display the result of the plausibility control and optionally warning messages.

It is also conceivable that the geometrical modeling of the machine part or at least of an individual component of the machine part can be modified by user input. The user can consequently not only select individual machine parts or machine part components from the database, but can rather model or modify them individually by user input in real time, in particular with respect to their geometrical dimensions, their positioning, location or alignment with respect to other machine part components, etc. Possible properties of the machine part or of the machine part component can also be modified and adapted. This in particular applies on the use of different tools which can be adapted by user input with respect to their number of gears, number of teeth, etc. to the actually used machine part components.

The database can be filled via a corresponding interface, in particular by supplementary entries on machine parts or machine part components. The data for this purpose are already provided in protected download areas by some tool manufacturers. In future, apparatus data will also be able to be provided by the apparatus manufacturers. This applies equally to the required raw data for the rendering process.

In addition to the process, the present disclosure further relates to a gear cutting machine having at least one display element, in particular a touch-sensitive, optionally a multi-touch-sensitive, display element, as well as a machine control for carrying out the method in accordance with the present disclosure or an advantageous embodiment of the present disclosure. The gear cutting machine in accordance with the present disclosure obviously has the same advantages and properties as the method in accordance with the present disclosure, so that a repeat description will be dispensed with at this point.

The present disclosure further relates to control software which is stored on a data carrier and which can be carried out on a gear cutting machine for carrying out the method in accordance with the present disclosure.

Further advantages and details of the present disclosure will be explained with reference to an embodiment shown in the drawings.

DETAILED DESCRIPTION

The method in accordance with the present disclosure for configuring the NC control of a gear cutting machine as well as the plausibility control of the configuration running in the background will be explained in the following with reference to a number of screenshots. FIGS. 1a to 1d show a number of chronological screenshots of the screen of a gear cutting machine which illustrate the procedure of virtual placing onto and removing from a mandrel by way of example. The screen is touch-sensitive, in particular multi-touch-operable, so that the operator can make his inputs comfortably by touching the screen, in particular by multi-finger gestures. The user interface displayed by the gear cutting machine display device enables information on the gear cutting machine to be displayed during machine operation, and to receive user inputs to adjust operation of the gear cutting machine. The user interface may represent non-transitory instructions or code stored in memory coupled with a processor for carrying out the instructions. The gear cutting machine may include a control system, referred to as a machine control, coupled to one or more sensor, the display/user interface, and to one or more actuators such as motors, of the gear cutting machine, in order to carry out control of the gear cutting automatically.

A working mandrel having two cutters, in this case chamfer cutters, positioned next to one another should be used for the gear cutting process. This fabricated working mandrel is received in the tool mount of the machining head of the gear cutting machine. Even before the putting into operation of the gear cutting machine, the required parameters of the tool used have to be input into the machine control for the machine configuration. The operator has the touch-sensitive screen of the gear cutting machine available for this purpose.

The operator enters the tool configuration (see FIGS. 1, 2) via the menu item Tools in the screen bar shown above and a graphical 3D modeling of the virtually set-up tool can be presented in a central screen position after its selection. The operator reproduces the readily available tool virtually via the virtual set up; the required control parameters are automatically available to the machine control.

In addition to the centrally arranged 3D model, the operator has various selection menus available for the placing onto a mandrel of various components, with the first menu providing different working mandrels, the second menu providing a plurality of variants of spacer sleeves and the following menus including different tool types. Different sub-variants are offered for each tool type.

The operator first selects a suitable mandrel from the corresponding menu. After a selection has been made, a 3D model of the mandrel is directly calculated by the processor and presented at a central screen position. A spacer ring as well as a chamfer cutter were selected in addition to the mandrel in FIG. 1b and virtually placed onto a mandrel. The operator can freely determine the order of the selected components on the mandrel here. Specifically, a spacer ring was selected having a ring thickness in the longitudinal mandrel direction of 10 mm.

Figure 1A:
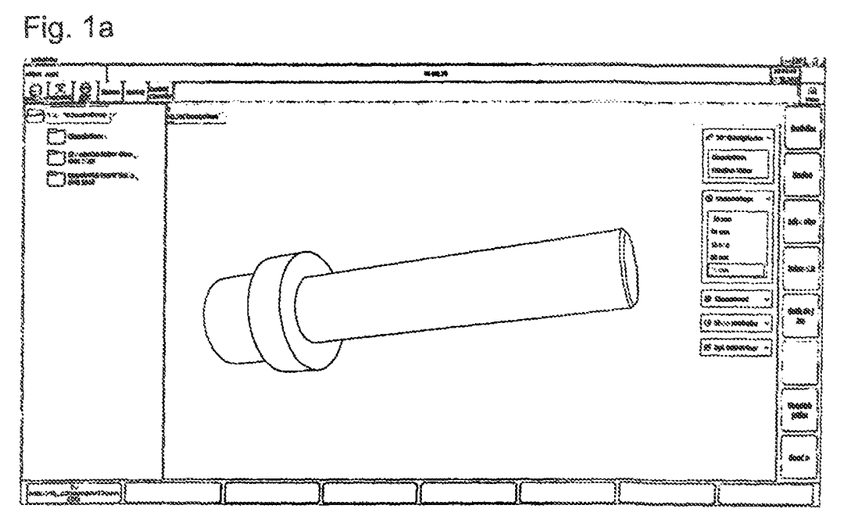
FIGS. 1a-1d show a plurality of screenshots of the display element of a gear cutting machine during the virtual placing on a mandrel in accordance with the present disclosure using cutters (chamfer cutters).
Figure 1B:
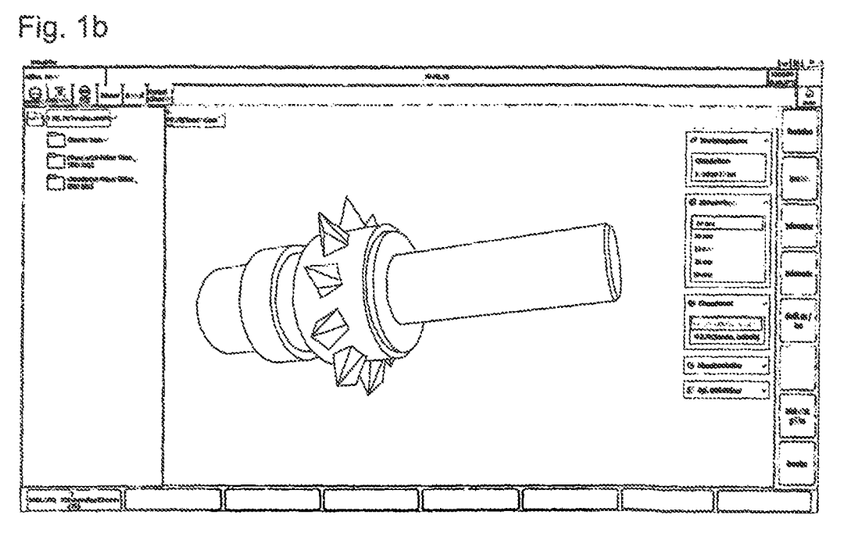
Figure 1C:
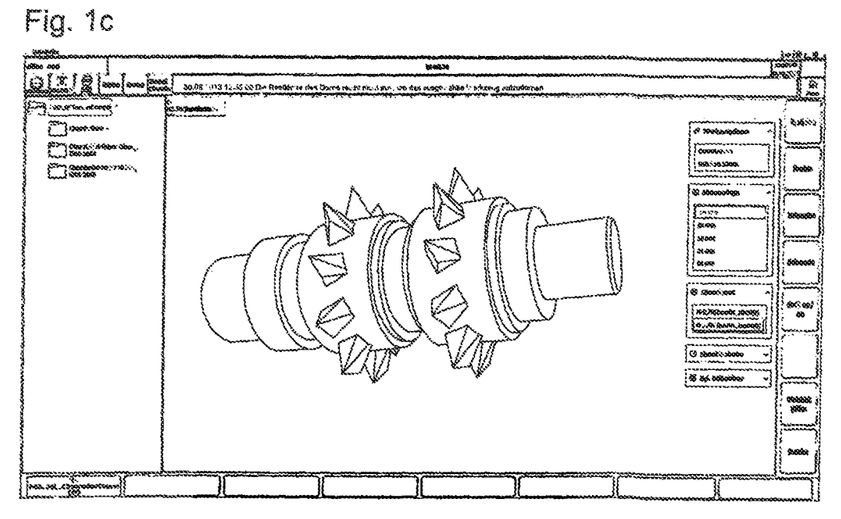

A further spacer ring, a further chamfer cutter and a final spacer ring were additionally placed on a mandrel in FIG. 1c. FIG. 1c furthermore illustrates the active plausibility check which is carried out in parallel in the background. In the example of FIG. 1c, the user has attempted to place a cylindrical hob onto a mandrel in addition to the mandrel composition shown. Since sufficient space for reception is not available on the working mandrel, a warning message with a time stamp is output in the upper status bar to draw the operator's attention to the incorrect input. Together with the warning message, the operator also receives a reason, namely that the free residual length of the mandrel is already exhausted and is not sufficient for the selected tool.

Figure 1D:
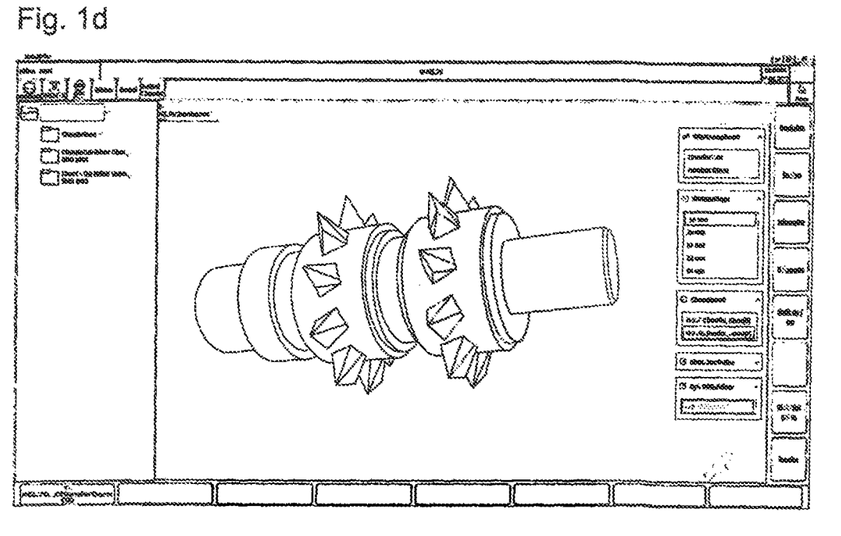

The user can mark the individual components by selection, e.g. by a double-click, for the removal from the mandrel and can remove it by dragging and dropping onto the cross-shaped symbol shown in the bottom right screen area. FIG. 1d shows by way of example the color-marked tool in the form of the second chamfer cutter which should be removed by dragging onto the cross-shaped symbol.

In addition to the process of placing on/removing from the mandrel, the operator can comfortably vary the visual angle of the shown working mandrel by a touch input. The operator thereby receives a virtual three-dimensional all-round view of the virtual working mandrel, which simplifies the visual manual plausibility check, i.e. the comparison with the actual machine part.

The presentation of the working mandrel takes place by a rendering process in real time which calculates and outputs the 3D presentation in real time in dependence on the operator input. Due to the present rendering information, the machine control additionally has the required parameters available with respect to the tool used for the subsequent gear cutting work. An additional manual input is no longer necessary. Furthermore, more detailed information than with known solutions is available to the machine control on the set-up machine parts which can be taken into account for an optimized machine control.

Figure 2A:
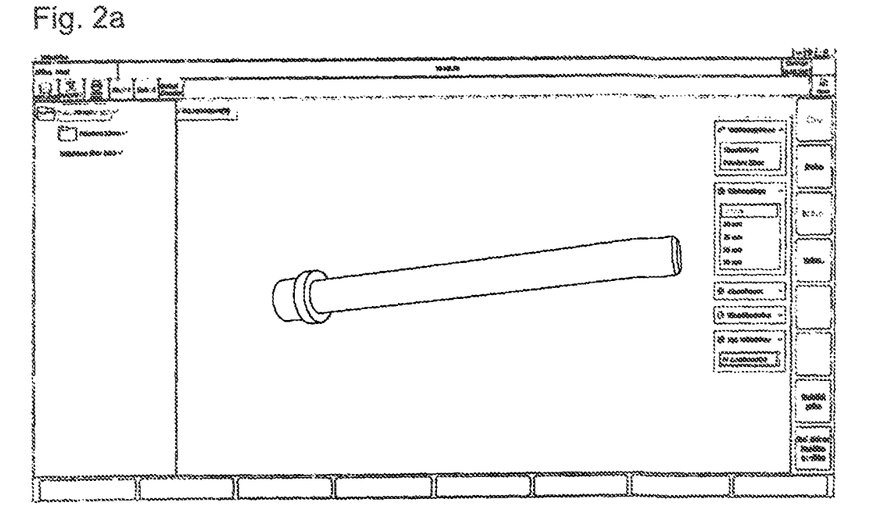
FIGS. 2a-2b show the virtual method for placing on a mandrel in accordance with the present disclosure with a placing of a cylinder cutter onto a mandrel.
Figure 2B:
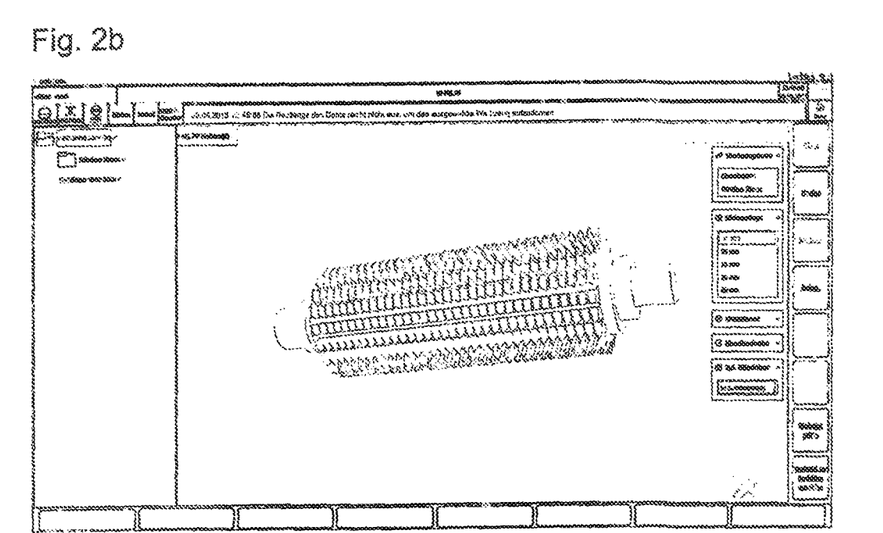

FIGS. 2a, 2b likewise show a further process of placing on/removing from a mandrel, with no chamfer cutter, however, being used, but rather a cylindrical hob. The automatic plausibility check in particular intervenes again in FIG. 2b. The placing onto a mandrel of a further hob was refused here since the available space on the working mandrel is not sufficient. The removal of the individual components from the mandrel takes place in an analog manner to the process shown in FIG. 1d.

In addition to the simple selection of the available individual components or tools, the user can also carry out individual modifications of the selected components. The hob could in particular be modified with respect to its periphery or its other properties. The operator has an input mask available for this purpose after selection of the component to be modified.

The disclosed user interface is particularly suited to enable improved operation of the gear cutting machine and thus takes advantage of processor instructions, sensor information, and particular user inputs, to enable particular user inputs including setup instructions, to be recognized and used to advantageously control automatic operation of the gear cutting machine.

In one example, a method of setting up a gear cutting machine, wherein the gear cutting machine is equipped with at least one machine part which can be set up, is disclosed. The method may include receiving parameters relating to the set-up machine part into a machine control for a subsequent gear cutting process; and virtually composing a graphical model of the machine part on a display element of the gear cutting machine in a user-controlled manner from one or more graphical part components, wherein required parameters for the subsequent gear cutting process are derived from the graphical modeling. In this way, in-situ building of the gear to be cut is possible taking into account parameters of the particular gear cutting machine, including limitations of the particular gear cutting machine via automatic processing in a processor utilizing graphical modeling that is concurrently displayed to the user.

Figure 3:
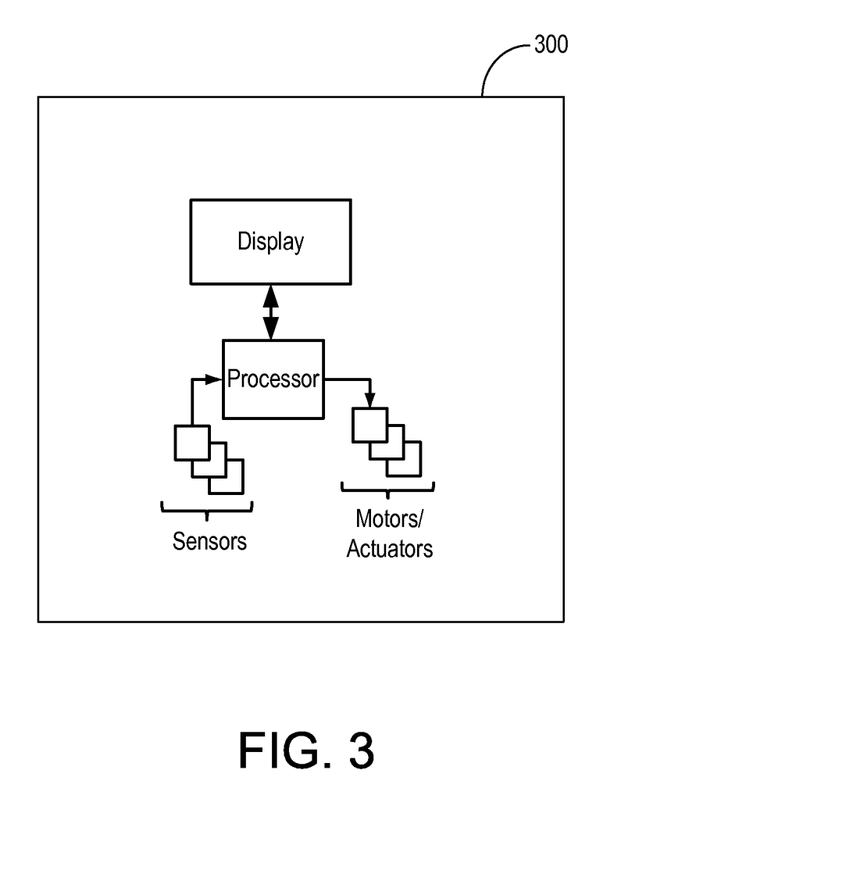
FIG. 3 illustrates the gear cutting machine schematically with a display element.

Referring to FIG. 3, it shows a gear cutting machine, such as the machine and corresponding systems described with regard to FIGS. 1-2. For example, gear cutting machine 300 is shown having a processor with memory having instructions stored therein for carrying out the various operations described herein, including communication with the display, which may be the display element described herein. The processor communicates with various sensors of the gear cutting machine as well as the display, and sends signals to the display and various actuators/motors of the gear cutting machine. In one example, the processor and gear cutting machine carry out a method of automatically setting up the gear cutting machine based on user input, wherein the gear cutting machine is equipped with at least one machine part which can be set up, comprising receiving parameters relating to the set-up machine part into a machine control for a subsequent gear cutting process; and virtually composing a graphical model of the machine part on a display element of the gear cutting machine in a user-controlled manner from one or more graphical part components, wherein required parameters for the subsequent gear cutting process are derived from the graphical modeling. Such operation improves the efficiency of gear cutting processes by enabling a faster setup with lower errors, in one example.

The invention claimed is:

1. A method of setting up a gear cutting machine, wherein the gear cutting machine is equipped with at least one machine part which can be set up, comprising:
   graphically presenting graphical part components on a multitouch-operable display element coupled to a machine control of the gear cutting machine;
   receiving, at the display element, user touch input, the user touch input selecting one or more of the graphical part components and virtually composing a graphical model on the display element in real time from the selected one or more graphical part components, wherein the graphical model is a graphical model of a machine part, and wherein the machine part is one of a plurality of machine parts which can be set up for use with the gear cutting machine;
   deriving required parameters for setting up the machine part for a subsequent gear cutting process in the gear cutting machine from the graphical model; and
   performing the gear cutting process in the gear cutting machine via the machine control, using the machine part, based on the required parameters.

2. The method in accordance with claim 1, wherein the machine part comprises a tool mandrel including one or more tools.

3. The method in accordance with claim 2, wherein the graphical model is calculated by a rendering process of the machine control, with required raw data being stored in a database of the gear cutting machine.

4. The method in accordance with claim 3, wherein the rendering process is a real time rendering process and wherein the user touch input interactively varies an underlying scene.

5. The method in accordance with claim 4, wherein the machine part and/or a composition of the machine part is selected via the user touch input from individual components from the database of the gear cutting machine.

6. The method in accordance with claim 5, further comprising performing a virtual plausibility check of the graphical model while taking account of a planned machining program and/or while taking account of composed individual components of the machine part and/or while taking account of further machine parts to be set up.

7. The method in accordance with claim 1, wherein geometrical modeling of the machine part or of an individual component of the machine part is modified by the user touch input with respect to geometrical dimensions of the machine part or the individual component of the machine part, and/or with respect to specific properties of the machine part or the individual component of the machine part, the specific properties including a number of gears, number of teeth, and/or tooth flank shape.

8. The method in accordance with claim 3, wherein the database is expanded via an interface with further entries on machine parts or on machine part components.

9. The method in accordance with claim 1, wherein the required parameters are automatically derived directly from the graphical model and supplied to the machine control, without additional input from a user.

10. The method in accordance with claim 1, wherein the setting up of the machine part for the subsequent gear cutting process does not include user input of pure numbers.

11. The method in accordance with claim 6, wherein performing the virtual plausibility check comprises, with the machine control, monitoring whether all tools required for the planned machining program as well as an apparatus for clamping a workpiece and, if present, a gripper for machine automation, were set up and/or configured via the user touch input.

12. A gear cutting machine comprising:
   at least one multitouch-operable display element;
   a processor having instructions stored in memory and communicating with the at least one display element; and
   a machine part controlled by the processor, wherein the machine part is one of a plurality of machine parts which can be set up for use with the gear cutting machine;
   wherein the instructions include instructions for setting up the gear cutting machine, including instructions for graphically presenting graphical part components on the at least one display element; receiving, at the display element, user touch input, the user touch input selecting one or more of the graphical part components and virtually composing a graphical model of the machine part on the display element in real time from the selected one or more graphical part components; deriving required parameters for setting up the machine part for a subsequent gear cutting process in the gear cutting machine from the graphical model; and performing the gear cutting process in the gear cutting machine via the machine control, using the machine part, based on the required parameters.

13. A method of setting up a gear cutting machine, wherein the gear cutting machine is equipped with at least one machine part, comprising:
   graphically presenting graphical part components on a multitouch-operable display element coupled to a machine control;
   receiving, at the display element, user touch input selecting one or more of the graphical part components;
   virtually composing and displaying a graphical model of the machine part on the display element in real time from the selected one or more graphical part components;
   deriving, via the machine control, required parameters for a subsequent gear cutting process in the gear cutting machine from data of the graphical model; and
   performing the subsequent gear cutting process in the gear cutting machine via the machine control with the required parameters,
   wherein the at least one machine part and/or a composition of the at least one machine part is selected via the user touch input from individual components from a database of the gear cutting machine,
   wherein the method further comprises performing a virtual plausibility check of the graphical model while taking account of a planned machining program, and
   wherein performing the virtual plausibility check comprises, with the machine control, monitoring whether all tools required for the planned machining program were set up via the user touch input.

14. The method in accordance with claim 13, wherein the machine part comprises a tool mandrel including one or more tools, and/or a workpiece, and/or an apparatus for clamping the workpiece, and/or a gripper for machine automation, and wherein performing the virtual plausibility check, with the machine control, further comprises monitoring whether the apparatus for clamping the workpiece and, if present, the gripper for machine automation were set up via the user touch input.

15. The method in accordance with claim 14, wherein the graphical model is calculated by a rendering process of the machine control, with required raw data being stored in the database of the gear cutting machine.

16. The method in accordance with claim 15, wherein the rendering process is a real time rendering process and wherein the user touch input interactively varies an underlying scene.

17. The method in accordance with claim 13, further comprising performing the virtual plausibility check of the graphical model while taking account of composed individual components of the machine part and/or while taking account of further machine parts to be set up.

18. The method in accordance with claim 17, wherein geometrical modeling of the machine part or of an individual component of the machine part is modified by the user touch input with respect to geometrical dimensions of the machine part or the individual component of the machine part, and/or with respect to specific properties of the machine part or the individual component of the machine part, the specific properties including a number of gears, number of teeth, and/or tooth flank shape.

19. The method in accordance with claim 18, wherein the database is expanded via an interface with further entries on machine parts or on machine part components.

* * * * *